United States Patent
Yeom et al.

(10) Patent No.: US 8,598,772 B2
(45) Date of Patent: Dec. 3, 2013

(54) FLAT DISPLAY AND METHOD OF FABRICATING THE SAME

(75) Inventors: Ji Yoon Yeom, ChungCheongNam-Do (KR); Insung Sohn, ChungCheongNam-Do (KR); Euisoo Kim, ChungCheongNam-Do (KR); Seung Won Park, ChungCheongNam-Do (KR); Jinhoon Lee, ChungCheongNam-Do (KR); EunYoung Cho, ChungCheongNam-Do (KR)

(73) Assignee: Samsung Corning Precision Materials Co., Ltd. (KR)

( * ) Notice: Subject to any disclaimer, the term of this patent is extended or adjusted under 35 U.S.C. 154(b) by 120 days.

(21) Appl. No.: 13/323,201

(22) Filed: Dec. 12, 2011

(65) Prior Publication Data

US 2012/0146482 A1      Jun. 14, 2012

(30) Foreign Application Priority Data

Dec. 13, 2010   (KR) .................. 10-2010-0127059
Dec. 6, 2011    (KR) .................. 10-2011-0129694

(51) Int. Cl.
   *H01J 5/16*         (2006.01)

(52) U.S. Cl.
   USPC ............................................ 313/112; 313/473

(58) Field of Classification Search
   USPC ........................................ 313/112, 461, 473
   See application file for complete search history.

(56) References Cited

U.S. PATENT DOCUMENTS

2008/0261057 A1   10/2008   Slobodin

FOREIGN PATENT DOCUMENTS

| EP | 0911676 | A2 | 4/1999 |
|---|---|---|---|
| EP | 2085812 | A2 | 8/2009 |

*Primary Examiner* — Vip Patel
(74) *Attorney, Agent, or Firm* — Lerner, David, Littenberg, Krumholz & Mentlik, LLP

(57) ABSTRACT

A flat display and a method of fabricating the same, in which the fabrication of the flat display is facilitated by employing a plate-to-plate method. The method of fabricating a flat display panel includes the steps of forming an optical bonding resin layer by applying an optical bonding resin on the underside of a transparent film, attaching a filter to the upper surface of the transparent film, and attaching the optical bonding resin layer to the upper surface of a display panel using a plate-to-plate method.

17 Claims, 7 Drawing Sheets

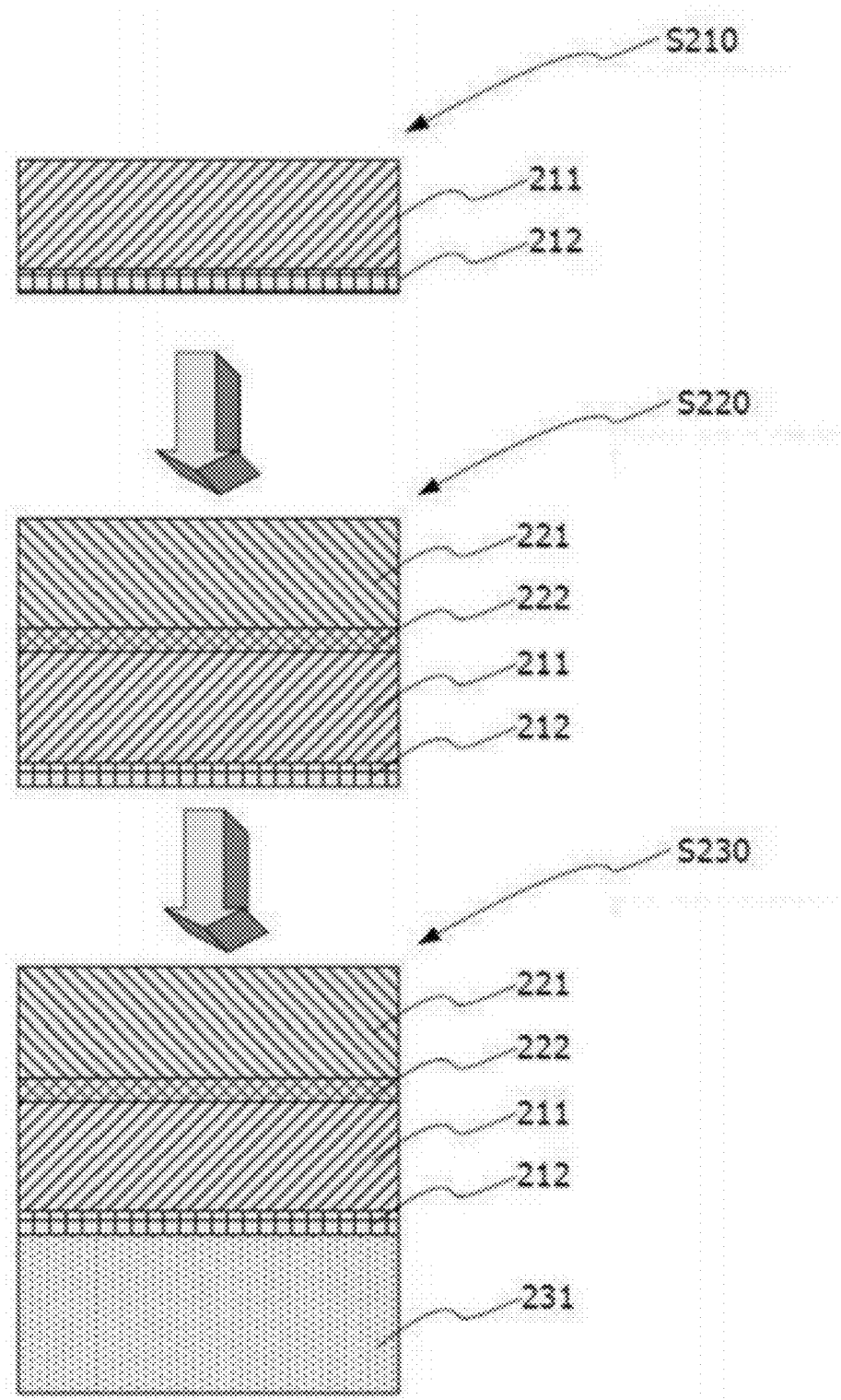

FLAT DISPLAY AND METHOD OF FABRICATING THE SAME

CROSS REFERENCE TO RELATED APPLICATION

The present application claims priority from Korean Patent Application Numbers 10-2010-0127059 filed on Dec. 13, 2010, and 10-2011-0129694 filed on Dec. 6, 2011, the entire contents of which applications are incorporated herein for all purposes by this reference.

BACKGROUND OF THE INVENTION

1. Field of the Invention

The present invention relates to a flat display, and more particularly, to a flat display and a method of fabricating the same, in which the fabrication of the flat display is facilitated by employing a plate-to-plate method.

2. Description of Related Art

Recently, the use of flat displays is rapidly increasing.

Accordingly, attempts to improve the quality of flat displays are being constructed.

FIG. 1A is a cross-sectional view showing an example of an air gap that is present between a flat display panel and a display filter in the related art.

In general, when a filter 110 is mounted on a flat display, an air gap 130 is present between the filter 110 and a display panel 120.

The air gap decreases the contrast ratio by inducing reflections.

Therefore, in order to resolve this problem, an optical bonding method has been used in the related art, in which the air is filled with a resin, which is then cured by irradiating with ultraviolet (UV) rays.

FIG. 1B is a cross-sectional view showing an example in which optical bonding is applied to a flat display of the related art.

With reference to FIG. 1B, the optical bonding method is described as follows.

The air gap 130 present in FIG. 1A decreases the contrast ratio by causing the reflection of incident light.

Therefore, in the related art, the decrease in the contrast ratio has been overcome by filling the air gap 130 with an adhesive 140 using an optical bonding process.

However, the optical bonding process of the related art has a problem in that expensive bonding equipment is required.

The optical bonding also has problems in that its process is complicated, and in that subsequent operation is impossible after the bonding is done.

Furthermore, the optical bonding process of the related art also has a problem in that after the adhesive is attached to the display panel, it is irradiated with UV rays or heat, which causes damage to elements that are vulnerable to heat.

For these reasons, there have been problems in that the fabrication cost and the defective fraction increased. In addition, when a defect occurs in the optical bonding process, products must be discarded, thereby leading to an additional problem of increased cost.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide a method of attaching a filter in a flat display in order to facilitate the attachment of the filter to a display panel.

In an aspect of the present invention, a method of fabricating a flat display includes the steps of: forming an optical bonding resin layer by applying an optical bonding resin on the underside of a transparent film; attaching a filter to the upper surface of the transparent film; and attaching the optical bonding resin layer to the upper surface of a display panel using a plate-to-plate method.

For this purpose, the flat display is configured such that a transparent film and a display panel are attached to each other via a cured optical bonding resin layer.

According to embodiments of the present invention, the fabrication process can be significantly simplified by curing the optical bonding resin layer first, and then adhering it to the display panel.

In addition, there is an advantage in that fabrication costs can be reduced since the expensive equipment that is used in an optical bonding process is not required.

Furthermore, it is possible to decrease the defective fraction of a display device, since neither ultraviolet (UV) rays nor heat affect the display device in the optical bonding process.

In addition, there is an advantage in that, when a defect occurs after the final product has been tested, the defect can be easily removed.

Finally, the fabrication cost is reduced, the defective fraction is reduced, and a product is easily repaired when it has a defect, thereby significantly reducing cost.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

BRIEF DESCRIPTION OF THE DRAWINGS

FIG. 2 is an example view showing a method of fabricating a flat display according to an exemplary embodiment of the present invention;

DETAILED DESCRIPTION OF THE INVENTION

Reference will now be made in detail to various embodiments of a flat display and a method of fabricating the same according to the present invention, examples of which are illustrated in the accompanying drawings and described below. While the invention will be described in conjunction with exemplary embodiments thereof, it is to be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims. In the following description of the present invention, detailed descriptions of known functions and components incorporated herein will be omitted when they may make the subject matter of the present invention unclear.

Figure 1A:
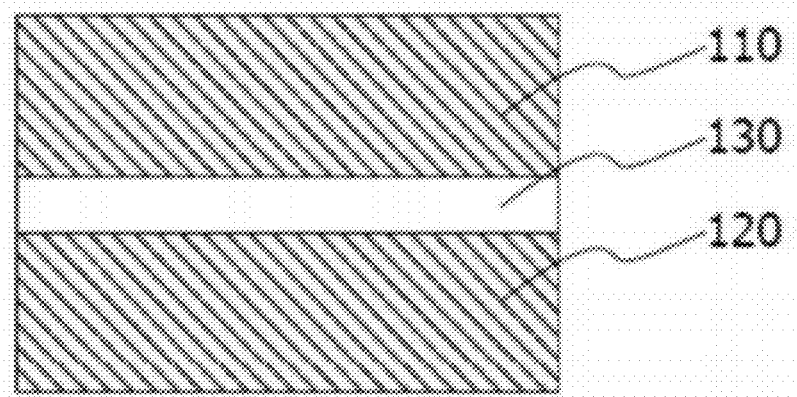
FIG. 1A is a cross-sectional view showing an example of an air gap which is present between a flat display panel and a filter in the related art.
Figure 1B:
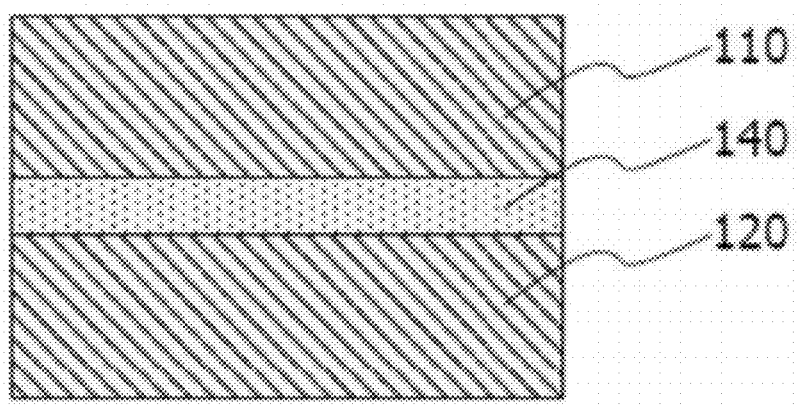
FIG. 1B is a cross-sectional view showing an example in which optical bonding is applied to a flat display of the related art.
Figure 3:
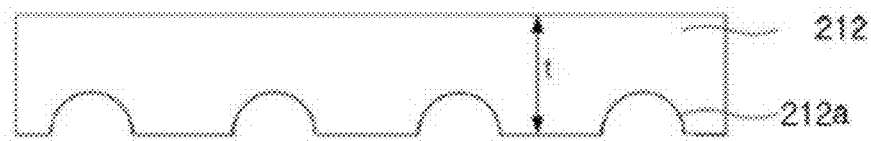
FIG. 3 is a cross-sectional view showing an example in which a pattern is formed on a cured optical bonding resin layer according to an exemplary embodiment of the present invention.
Figure 4:
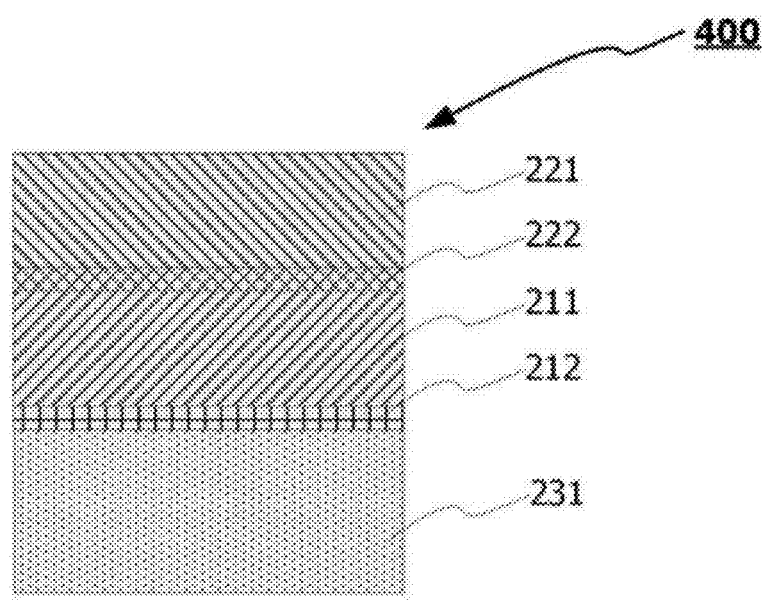
FIG. 4 is a cross-sectional view showing an example of the structure of a flat display according to an exemplary embodiment of the present invention.

Throughout FIG. 2 to FIG. 4, the same reference numerals and signs are used to designate the same or similar components.

The basic principle of the present invention is the simplification of an optical bonding process when a flat display is fabricated using a plate-to-plate method.

First, the term "flat display," employed in embodiments of the present invention, is defined so as to include a display such as a Liquid Crystal Device (LCD), an Organic Electroluminescent Display (OLED), a Plasma Display Panel (PD), or the like.

FIG. 2 is an example view showing a method of fabricating a flat display according to an exemplary embodiment of the present invention.

Referring to FIG. 2, the method 200 of fabricating a flat display according to the present invention includes the step S210 of forming an optical bonding resin layer 212 on the underside of a transparent film 211, the step S220 of attaching a display filter 221 on the upper surface of the transparent film 211, and the step S230 of attaching the optical bonding resin layer 212 and the upper surface of the display panel 231 using a plate-to-plate method.

The method 200 of fabricating a flat display according to this embodiment is described in detail as follows.

First, an optical bonding resin is uniformly applied on the underside of the transparent film 211 in S210.

It is preferred that the transparent film 211 be made of Polyethyleneterephthalate (PET).

Afterwards, the optical bonding resin applied on the underside of the transparent film 211 is cured by irradiating with ultraviolet (UV) rays, so that the resin is converted into an elastic material.

It is preferred that the optical bonding resin be an acrylic adhesive elastic material or a silicone-based adhesive elastic material that contains a urethane-based oligomer.

In another embodiment, the optical bonding resin may be cured by irradiating with heat.

After the optical bonding resin on the underside of the transparent film 211 described above is cured, a Pressure Sensitive Adhesive (PSA) 222 is applied on the upper surface of the transparent film 211.

Afterwards, the filter 221 is attached to the surface of the transparent film 211 on which the adhesive 222 is applied in S220.

Finally, in 5230, the optical bonding resin layer 212 is attached to the upper surface of the display panel 231 using a plate-to-plate method.

In the case of Liquid Crystal Device (LCD), the display panel 231 may be, for example, a panel to which a Backlight Unit (BLU) has not yet been assembled.

In addition, it is preferred that the optical bonding resin layer be attached to the display panel 231 using a roll lamination technique.

The roll lamination technique refers to a method of attaching a layer to the filter 221 by applying uniform pressure onto the upper surface of the filter 221 using a tool such as a roller.

That is, when the uppermost surface of the filter 221 which includes a glass base, is pressed using the roll lamination technique, the optical bonding resin layer 212 is attached to the upper surface of the display panel 231 (i.e. the upper glass substrate of the display panel).

A pattern may be formed on the optical bonding resin layer 212.

The pattern in the optical bonding resin layer 212 is described with reference to FIG. 3.

FIG. 3 is a cross-sectional view showing an example in which the pattern is formed on the cured optical bonding resin layer 212 according to an exemplary embodiment of the present invention.

Referring to FIG. 3, the cured optical bonding resin layer 212 of the present invention is an adhesive elastic material, and thus can form a pattern because of its high elastic modulus.

Although FIG. 3 shows an embodiment in which lens sections having a semicircular cross-section are provided as a pattern, the present invention is not limited thereto. The lens sections will be described later.

It is preferred that the optical bonding resin layer 212 having the lens sections 212a be attached to the display panel 231 using a roll lamination technique, since it is an adhesive elastic material.

It is also preferred that the thickness t of the optical bonding resin layer 212 not exceed 300 μm.

The optical bonding resin layer 212 is coated to a thickness that does not exceed 300 μm because it is highly possible that some portions may not be cured when the layer is cured if the layer is coated more thickly than this value.

In addition, if the layer is coated thickly, the problem of the high possibility of the creation of pores may also occur.

It is further preferred that the layer be coated to a thickness of 150 μm or less.

It is yet further preferred that the optical bonding resin layer 212 of the present invention be coated to a thickness of 100 μm or less.

FIG. 4 is a cross-sectional view showing an example of the structure of a flat display according to an exemplary embodiment of the present invention.

Referring to FIG. 4, the flat display 400 of this embodiment includes a filter 221, an adhesive 222, a transparent film 221, an optical bonding resin layer 212, and a display panel 231.

A detailed description is given below of the flat display 400 of this embodiment with reference to FIG. 4.

First, the filter 221 includes a transparent glass base because light that is emitted from the flat display 400 passes through the filter.

The filter 221 may also include a variety of functional layers such as an antireflection layer.

The filter 221 is attached to the upper surface of the transparent film 211 via the adhesive 222.

It is preferred that the transparent film 211 be made of Polyethyleneterephthalate (PET), but the present invention is not limited thereto.

The optical bonding resin layer 212 is formed on the underside of the transparent film 211 by uniformly applying an optical bonding resin on the underside and then irradiating the resin with UV rays so that it is cured.

In another embodiment, the optical bonding resin layer 212 may be cured by irradiating with heat.

Alternatively, the optical bonding resin layer 212 may be made of an acrylic adhesive elastic material or a silicone-based adhesive elastic material that contains a urethane-based oligomer.

The optical bonding resin layer 212 of the present invention exhibits adhesive characteristics when it is cured using UV rays.

The cured optical bonding resin layer 212 is attached to the display panel 221.

In greater detail, the cured optical bonding resin layer 212 is attached to the display panel 231 using a roll lamination technique.

Specifically, the optical bonding resin layer 212 is attached to the uppermost surface of the filter 221, which includes the glass base (e.g. the upper surface of a glass substrate of the display panel), by pressing the uppermost surface of the filter 221 using the roll lamination technique.

In addition, a pattern may be formed in a variety of shapes on the cured optical bonding resin layer 212.

Here, the attachment may be carried out by applying uniform pressure to the upper surface of the filter 221 using a tool, such as a press, instead of the roll lamination technique.

Lens Section

LCDs of the related art have problems in that a color shift occurs depending on the viewing angle and in that the color changes as the viewing angle increases.

In addition, displays of the related art, in particular, TN mode LCDs, have problems of gamma-curve distortion and grayscale inversion.

Therefore, it is demanded that the viewing angle of a display be ensured by reducing the color shift based on the increase in the viewing angle, to thus improve the quality of the display image.

It is also demanded that an LCD that can prevent ghosting and hazing while reducing color shift be provided.

It is also demanded that an LCD in which gamma-curve distortion and grayscale inversion are reduced can be provided.

In response to these demands, the optical bonding resin layer according to exemplary embodiments of the present invention includes lens sections.

Figure 5:
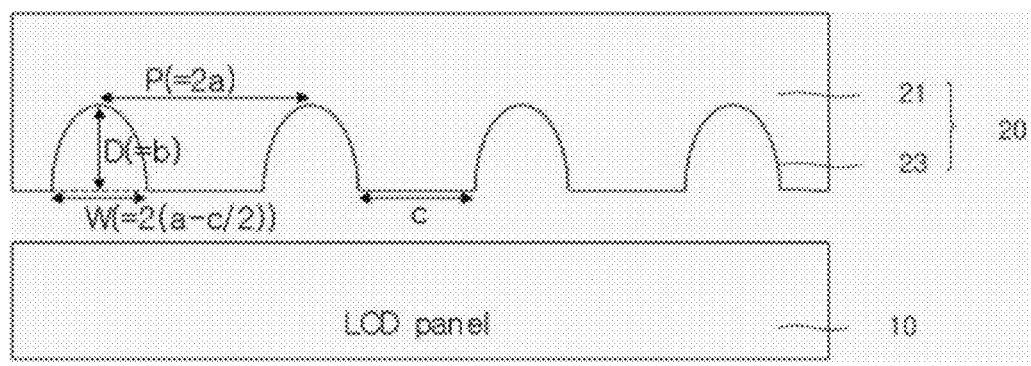
FIG. 5 is a cross-sectional view showing lens sections according to an exemplary embodiment of the present invention.

FIG. 5 is a cross-sectional view showing lens sections according to an exemplary embodiment of the present invention.

As shown in the figure, the optical bonding resin layer includes a background layer 21 and lens sections 23.

The background layer 21 is formed as a layer of light-transmitting material. The background layer 21 may be made of transparent polymer resin, in particular, ultraviolet (UV) curing transparent resin.

The lens sections 23 are formed by engraving or embossing the background layer 21 to a predetermined depth or height. The lens sections 23 reduce color shift by refracting light that is incident thereon. The lens sections 23 can reduce the color change that occurs in response to an increase in the viewing angle using a color mixing effect. It is possible to allow more of the light that is emitted in the direction perpendicular to the display panel to pass through by reducing the width such that it is smaller than the spacing of the lens sections.

The lens sections serve to change the direction of light that is emitted perpendicular to the display panel, such that it is not perpendicular thereto, and change the direction of a portion of light that is not originally emitted perpendicular thereto, such that it is emitted perpendicular thereto. That is, the lens sections can cause color mixing by changing the direction of light based on the viewing angle, thereby reducing color shift.

The lens sections 23 may have a pattern selected from among stripes having a wedge-shaped cross-section, waves having a wedge-shaped cross-section, a matrix having a wedge-shaped cross-section, a honeycomb having a wedge-shaped cross-section, dots having a wedge-shaped cross-section, stripes having a quadrangular cross-section, waves having a quadrangular cross-section, a matrix having a quadrangular cross-section, a honeycomb having a quadrangular cross-section, dots having a quadrangular cross-section, stripes having a semicircular cross-section, waves having a semicircular cross-section, a matrix having a semicircular cross-section, a honeycomb having a semicircular cross-section, dots having a semicircular cross-section, stripes having a semi-elliptical cross-section, waves having a semi-elliptical cross-section, a matrix having a semi-elliptical cross-section, a honeycomb having a semi-elliptical cross-section, dots having a semi-elliptical cross-section, stripes having a semi-oval cross-section, waves having a semi-oval cross-section, a matrix having a semi-oval cross-section, a honeycomb having a semi-oval cross-section, and dots having a semi-oval cross-section. Here, the wedge-like cross-section may include a trapezoidal or triangular cross-section. In addition, the term "semi-oval cross-section" indicates a curved cross-section, other than semicircular cross-section and a semi-elliptical cross-section, and includes, for example, a parabolic cross-section and a hyperbolic cross-section. Further, the terms "semicircular cross-section," "semi-elliptical cross-section," and "semi-oval cross-section" are not limited to the shapes that are obtained by dividing circular, elliptical, or oval shapes precisely into two sections, but include shapes in which part of the outline of the cross-section of the lens sections includes an arc, an elliptical arc, or a parabola. That is, "semi-elliptical cross-section" may have a shape that has two elliptical arc lateral sides and a linear upper (or lower) side.

The present invention is not limited thereto, but may include a variety of shapes. It is preferred that the cross-section be horizontally symmetrical.

In addition, the pattern constituted of stripes may also include a variety of patterns, such as a horizontal stripe pattern, a vertical stripe pattern, and the like. The horizontal stripe pattern is effective in compensating for vertical viewing angles. The vertical stripe pattern is effective in compensating for horizontal viewing angles.

In order to prevent a moiré phenomenon, the lens sections 23 may be formed to have a predetermined bias angle with respect to the edge of the background layer 21. For example, in the stripe pattern, the stripes may have a predetermined angle of inclination with respect to the horizontal or vertical direction.

It is preferred that the lens sections 23 be formed as recesses which have a wedge-shaped cross-section and are periodically formed on one surface of the background layer 21. The recesses are spaced apart from each other and are parallel to each other.

Although FIG. 5 shows an embodiment in which the lens sections 23 are formed by engraving the background layer 21, the present invention is not limited thereto. Embossed lens sections may also be provided.

Figure 6:
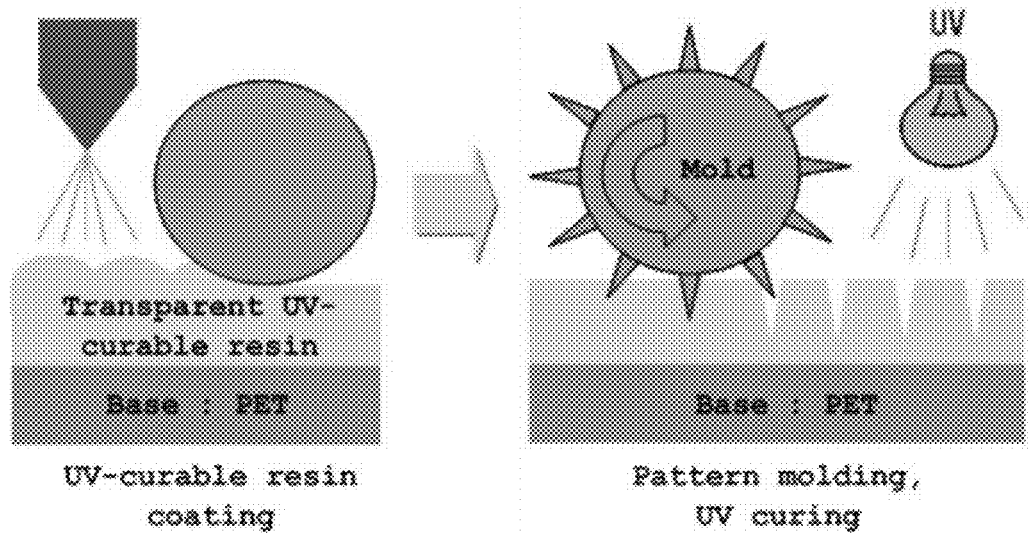
FIG. 6 is a view showing a method of manufacturing the optical bonding resin layer according to an exemplary embodiment of the present invention.

FIG. 6 is a view showing a method in which the optical bonding resin layer is manufactured according to an exemplary embodiment of the present invention.

For the materials for the transparent film, it is possible to use, for example, Polyethyleneterephthalate (PET), Polycarbonate (PC), Polyvinyl Chloride (PVC), Triacetate Cellulose (TAC), or the like.

Figure 7:
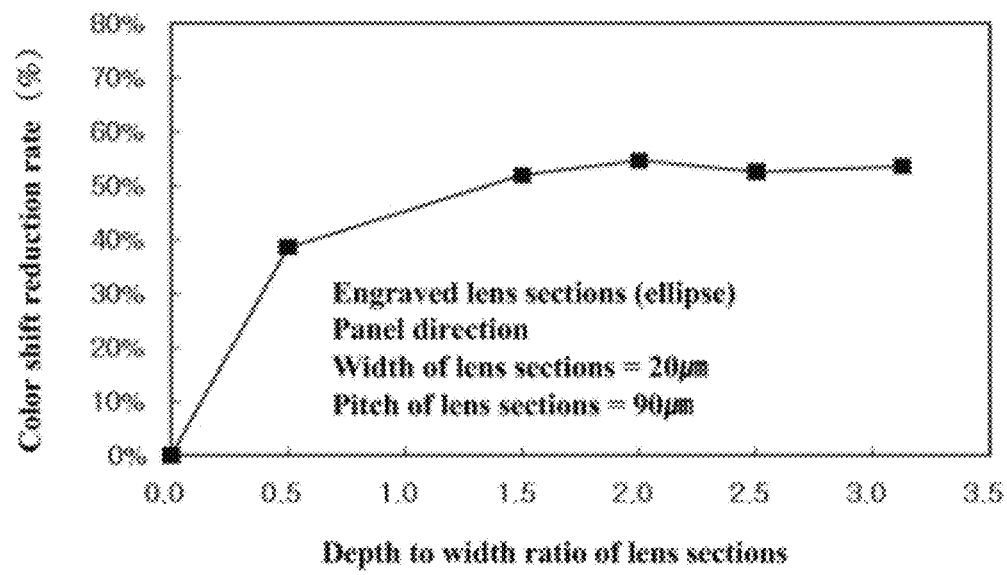
FIG. 7 is a graph showing the relationship between the depth-to-width ratio of the lens sections and the rate of color shift reduction.

FIG. 7 is a graph showing the relationship between the depth (D(=b)) to width (W) ratio of the lens sections and the rate of color shift reduction.

The degree of color shift $\Delta u'v'$ that is discernible with the human eye is 0.004 or more. An S-IPS display panel having the best color shift characteristics exhibits a maximum color shift $\Delta u'v'$ of 0.02 at viewing angles ranging from 0 degrees to 60 degrees. Therefore, the rate of color shift reduction is required to be 20% or more (that is, maximum $\Delta u'v'$ is required to be 0.016 or less) in order to attain a reduction in color shift that is discernible with the human eye. It can be appreciated from the graph of FIG. 7 that the depth-to-width ratio of the lens sections is required to be 0.25 or more in order for the color shift reduction to be 20% or more. In addition, the depth-to-width ratio of the lens sections is required to be 6 or less, because it is impossible to manufacture the film using a common method of forming lens sections if the depth-to-width ratio of the lens sections exceeds 6.

Figure 8:
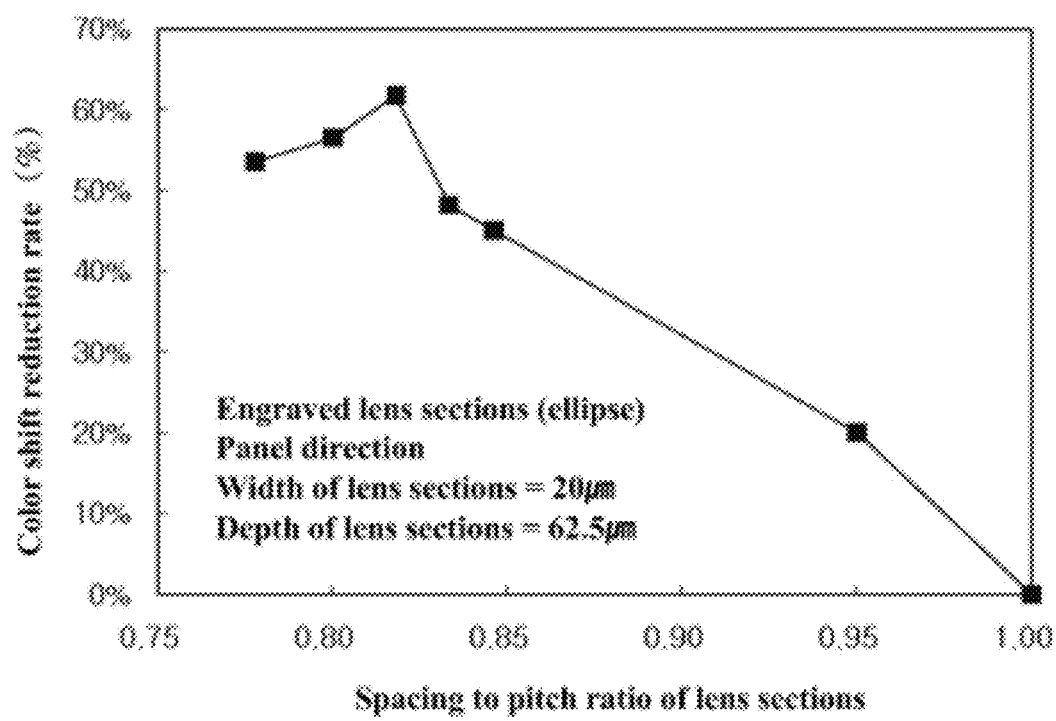
FIG. 8 is a graph showing the relationship between the spacing-to-pitch ratio of the lens sections and the rate of color shift reduction.

FIG. 8 is a graph showing the relationship between the spacing (C) to pitch (P(=2a)) ratio of the lens sections and the rate of color shift reduction.

Likewise, the spacing-to-pitch ratio of the lens sections (i.e., the ratio of the spacing between the lens sections with respect to the pitch of the lens sections) is required to be 0.95 or less in order for the color shift reduction to be 20% or more.

Figure 9:
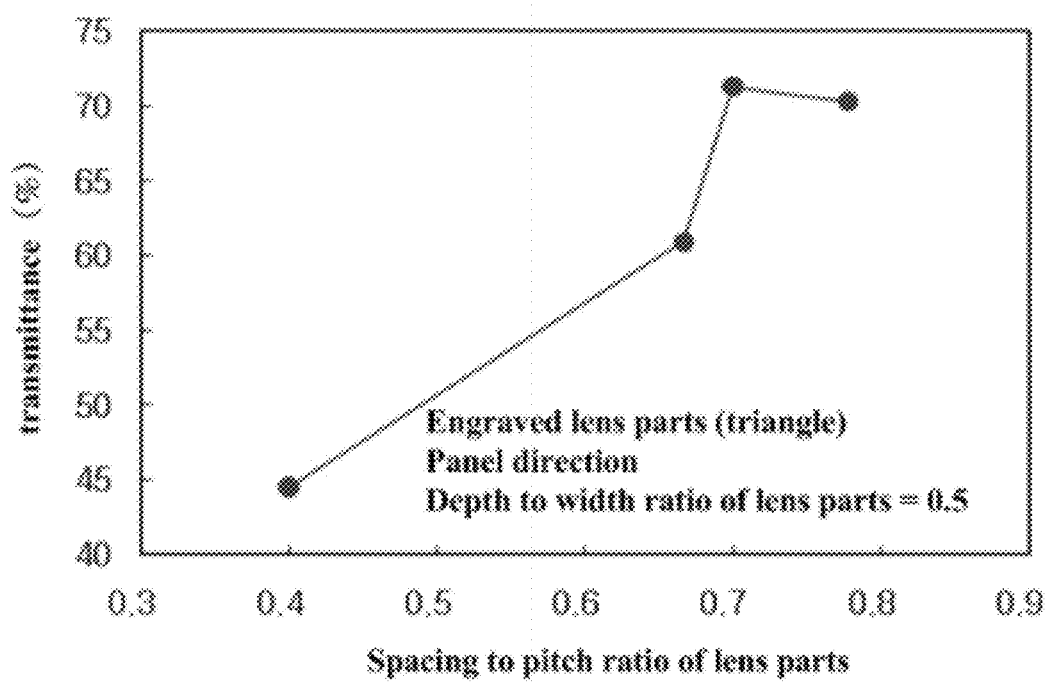
FIG. 9 is a graph showing the relationship between the spacing-to-pitch ratio of the lens sections and transmittance.

FIG. 9 is a graph showing the relationship between the spacing (C) to pitch (P) ratio of the lens sections and transmittance.

As shown in the graph of FIG. 9, the greater the spacing-to-pitch ratio of the lens sections, the greater the light transmittance of the film. A film having a light transmittance below 50% is worthless as a commercial product. Accordingly, the spacing-to-pitch ratio of the lens sections is required to be 0.5 or more in order for the transmittance to be 50% or more.

Therefore, it can be appreciated that, from the graphs shown in FIG. 6 and FIG. 9, the spacing-to-pitch ratio of the lens sections preferably ranges from 0.5 to 0.95

Figure 10:
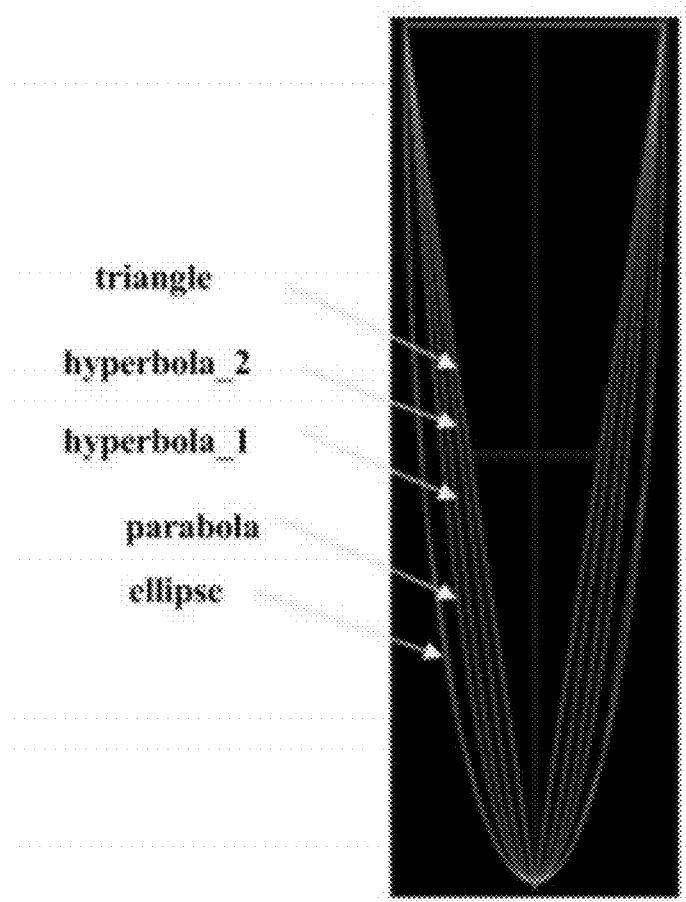
FIG. 10 is a view showing the cross-sectional shapes of the lens sections.

FIG. 10 is a view showing the cross-sectional shapes of the lens sections.

When the occurrence of a ghost image was observed while varying the curvature of the lens sections (having a width of 27 μm, a depth of 81 μm, and a pitch of 90 μm), it was appreciated that lens sections having a semi-elliptical cross-section most effectively prevent ghosting.

The ghost image (false image) is observed more distinctly as the shape is changed from a semi-elliptical shape to a triangular shape, that is, as the curvature decreases.

When the lens sections of this embodiment are mounted in front of the display panel, the ghost image becomes more distinct as the lens sections are spaced further apart from the display panel. (When the lens sections are in close contact with the display panel, it is difficult to distinguish the ghost image from the original image because the gap between the ghost image and the original image is very small.) The ghost image distorts the original image on the display panel. Therefore, a solution that can reduce color shifting without creating ghost images is required.

In addition, if the lens sections are provided such that they are spaced apart from the display panel, not only the foregoing problem of ghosting, but also the problem of hazing occurs, since the lens sections diffuse lights reflected from the display panel and the flat surfaces between the lens sections. That is, light incident onto the background layer and the display panel is reflected, once or multiple times, from the interface between the background layer and the air (air between the background layer and the display panel) and from the interface between the air and the display panel, and is then incident onto the lens sections. The lens sections then diffuse the incident light, which causes hazing. This phenomenon reduces bright room contrast ratio, thereby lowering visibility. Therefore, a solution that can prevent both ghosting and hazing from occurring is required.

By setting the lens sections in close contact with the display panel, ghosting and hazing can be prevented, and transmittance can be increased.

Here, the background layer may be made of UV-curable transparent elastomer such that it can be easily attached directly to the display panel. Available materials for the background layer may include, but are not limited to, acrylic elastomer, silicone-based elastomer (Polydimethylsiloxane: PDMS), urethane-based elastomer, Polyvinyl Butyral (PMB) elastomer, Ethylene Vinyl Acetate (EVA)-based elastomer, Polyvinyl Ether (PVE)-based elastomer, saturated amorphous polyester-based elastomer, melamine resin-based elastomer, and the like.

As the result of the experiment, the lens sections according to embodiments of the present invention can reduce color shift and, in particular, the TN mode LCD can reduce gray-scale inversion and gamma-curve distortion.

It is possible to prevent ghost images by providing the lens sections such that they are in close contact with the display panel and have a pitch of 45 μm or less. It is preferred that the lens sections have a pitch of 45 μm or less while satisfying both the depth-to-width ratio and the spacing-to-pitch ratio described above. If the lens sections have a size less than 0.01 μm, the effect of the lens sections is insignificant, since they act like a thin film that has a refractive index midway between the refractive index of the background layer and the refractive index of the air rather than realizing the above-described color mixing by using reflection, refraction, or diffusion of light. Therefore, it is preferred that the pitch of the lens sections be 0.01 μm or more.

Although the color shift is reduced using the lens sections as described above, the quality of an image is not good when the image is viewed at large horizontal viewing angles of 50° or more, since light exiting from the display at those angles has low luminance. Therefore, the demand exists for a display that makes it possible to provide bright images at a high viewing angle of 50° or more.

For this, the background layer can be manufactured such that it has a low refractive index ranging from 1.40 to 1.45, instead of a refractive index of 1.5, which is generally used. Then, a clear image can be produced because of the increase in luminance at a high viewing angle of 50° or more.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A flat display comprising:
a transparent film;
an optical bonding resin layer formed on a lower surface of the transparent film, the optical bonding resin layer having adhesivity when cured; and
a display panel,
wherein the optical bonding resin layer is in close contact with an upper surface of the display panel so that the optical bonding resin layer is attached to the upper surface of the display panel using the adhesivity thereof.

2. The flat display of claim 1, wherein the optical bonding resin layer has a pattern formed thereon.

3. The flat display of claim 1, wherein the optical bonding resin layer has a thickness of 300μ or less.

4. The flat display of claim 1, further comprising a display filter,
wherein the display filter is attached to an upper surface of the transparent film by means of a pressure sensitive adhesive.

5. The flat display of claim 4, wherein the optical bonding resin has adhesivity, the adhesivity of the optical bonding resin layer being smaller than that of the pressure sensitive adhesive.

6. The flat display of claim 1, wherein the display filter comprises a glass base.

7. The flat display of claim 1, wherein the optical bonding resin layer comprises an ultraviolet-curable resin or heat-curable resin.

8. The flat display of claim 1, wherein the optical bonding resin layer is made of an acrylic adhesive elastic material that contains a urethane-based oligomer or a silicone-based adhesive material.

9. The flat display of claim 1, wherein the optical bonding resin layer comprises:
a background layer; and
a plurality of lens sections engraved or embossed on the background layer, the lens sections being spaced apart from each other,
the plurality of lens sections making light that is incident onto the lens sections dispersed so that the dispersed light mixes with light that passes between the lens sections that are spaced apart from each other.

10. The flat display of claim 9, wherein the lens sections have a depth-to-width ratio of 0.25 or more.

11. The flat display of claim 9, wherein the lens sections have a spacing-to-pitch ratio ranging from 0.5 to 0.95.

12. The flat display of claim 9, wherein the lens sections have a pitch of 45μm or less.

13. The flat display of claim 9, wherein the background layer have a refractive index ranging from 1.40 to 1.45.

14. The flat display of claim 9, wherein the lens sections have a cross-sectional shape that includes an elliptical arc.

15. The flat display of claim 9, wherein the lens sections have a pattern selected from the group consisting of stripes having a wedge-shaped cross-section, waves having a wedge-shaped cross-section, a matrix having a wedge-shaped cross-section, a honeycomb having a wedge-shaped cross-section, dots having a wedge-shaped cross-section, stripes having a quadrangular cross-section, waves having a quadrangular cross-section, a matrix having a quadrangular cross-section, a honeycomb having a quadrangular cross-section, dots having a quadrangular cross-section, stripes having a semicircular cross-section, waves having a semicircular cross-section, a matrix having a semicircular cross-section, a honeycomb having a semicircular cross-section, dots having a semicircular cross-section, stripes having a semi-elliptical cross-section, waves having a semi-elliptical cross-section, a matrix having a semi-elliptical cross-section, a honeycomb having a semi-elliptical cross-section, dots having a semi-elliptical cross-section, stripes having a semi-oval cross-section, waves having a semi-oval cross-section, a matrix having a semi-oval cross-section, a honeycomb having a semi-oval cross-section, and dots having a semi-oval cross-section.

16. The flat display of claim 9, wherein the lens sections are formed on a surface of the background layer that faces the display panel.

17. The flat display of claim 1, comprising a liquid crystal display.

* * * * *